Feb. 3, 1970　　　　W. L. BELL　　　　3,493,082

CRUSHABLE ENERGY ABSORBER

Filed Dec. 18, 1967

INVENTOR.
WILBUR L. BELL
BY
Jack C. Munro
-AGENT-

United States Patent Office 3,493,082
Patented Feb. 3, 1970

3,493,082
CRUSHABLE ENERGY ABSORBER
Wilbur L. Bell, Garden Grove, Calif., assignor to McDonnell Douglas Corporation, a corporation of Maryland
Filed Dec. 18, 1967, Ser. No. 691,310
Int. Cl. F16f 7/12
U.S. Cl. 188—1        3 Claims

ABSTRACT OF THE DISCLOSURE

A crushable energy absorbing cylinder having thereon a plurality of integral, spaced, annular, stiffening flanges whereby the compartments of the cylinder located between the flanges vary as to wall thickness to cause the different compartments to crush at varying loads.

Background of the invention

It is quite common in the use of rigid frame structures, which are subjected to loads of varying degrees, to employ in conjunction therewith a device which can absorb energy if the force to which the structure is subjected exceeds the yield point stress of the structural material. The device of the present invention has been primarily designed for the protection of rigid airship structures as well as superstructures of airplanes under overload conditions which might occur in exceptional circumstances. Specifically, the energy absorbing device of this invention is designed and adapted to protect the tail end of an aircraft from damage should the airplane unexpectedly pivot backwardly about its main landing gear during landing or take-off. However, it is to be understood that the energy absorber in the present invention could be employed in conjunction with any rigid structure wherein that structure is subjectable to an excessive force of either tension or compression which may exceed the yield point of the structural material.

Many different types of energy absorbing devices are known. These absorbing devices can be generally divided into two groups, the first group being of the nondestructive type of absorber such as pneumatic or hydraulic apparatus and the second group being a destructive type of absorber wherein a portion of the absorber is permanently deformed. In considering the particular aircraft environment in which the energy absorber is to be employed, the absorber must be capable of high energy absorption while moving in the shortest stroke possible with the entire apparatus occupying a relatively small installation volume.

It has been found that all the known hydraulic and pneumatic type of shock absorbers could not meet all three requirements. As to the destructible type of energy absorbers, balsa wood, foam plastic and sheet metal cylinders all required excessive volume. Aluminum honeycomb types of absorbers look promising, however, it was found that no honeycomb was in existence that would meet the high energy requirement.

Summary of the invention

Of all the types of destructible energy absorbers it was thought that the crushable cylinder type looked the most promising. If the cylinder is constructed of a metallic material, such as aluminum or steel, a maximum amount of energy is absorbed upon the crushing of such a tube. However, one of the major disadvantages of such a device is its tendency to buckle during a crushing action, i.e. the difficulty of controlling the destruction of the cylinder. The maximum amount of energy is absorbed when the cylinder is crushed in a lineal direction. The apparatus of the present invention overcomes the above prior difficulty of a cylindrical type of crushable energy absorber.

The present invention relates to an energy absorbing unit consisting of a one piece cylindrical tube with integral annular stiffening flanges spaced along the axial direction of the cylindrical tube. The purpose of the flanges is to force the tube to crush only under the action of a lineal axial force and to not buckle sideways. This assures that the tubing between each pair of flanges is equally wrinkled about its circumference.

It has been found desirable to design the cylindrical tube to include two separate areas, one area of which has a lesser wall thickness than the second area. In this manner, the area of the lesser wall thickness will crush at a load which is less than the load required to crush the second area. In actual practice, when employed in the environment of a tail skid for aircraft, it has been found that the second area should crush at a load of approximately one and one half times as great as the load required to crush the first area. This is very close to the load which would cause structural failure of the aircraft. Therefore, the second area serves as the last resort to prevent structural failure of the rigid aircraft structure. The first energy absorbing area has been designed to absorb forces at an energy level which would insure that there would be no damage resulting from such a force to the airplane, but yet absorbing the greatest possible force encountered in the majority of instances. It has been found that six compartments within the first energy absorbing area has been quite satisfactory.

Within the first energy absorbing area it has been discovered that, to insure uniformity in the crushing of the cylinder, one of the compartments must be formed at a slightly smaller wall thickness than the other compartments within the area. This is necessary to lower the initial peak load to bring it to approximately the same level as was required to crush the remainder of the compartments in the first energy area. The reason for this should be apparent as to the cylinder has not yet been subjected to any stress and has not been weakened to any degree. Therefore, the initial force to cause the initial fatigue in the material is greater than the subsequent failures.

The advantages of the energy absorber of this invention are as follows: Compactness combined with high energy absorption in a relatively short stroke, consistency of buckling, high energy absorbed per pound of absorber material and an absorber unit which requires no maintenance other than replacement of the crushable tube after it is used.

Description of the shown embodiment

Figure 1:
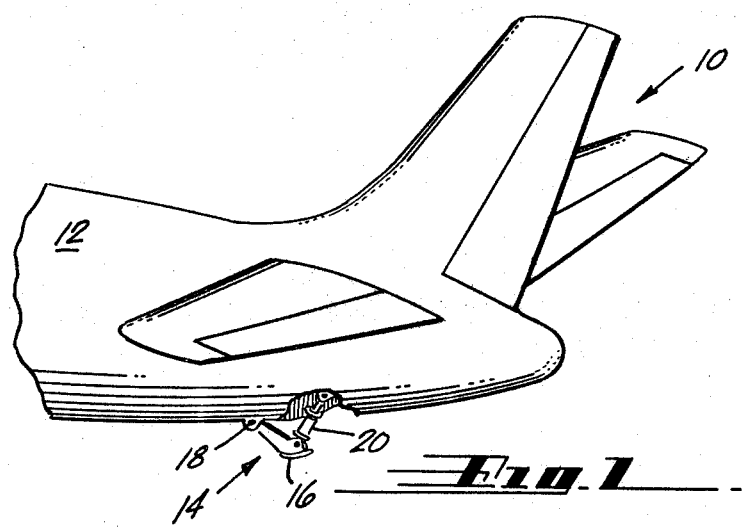
FIGURE 1 is a pictorial view of the tail portion of an aircraft which embodies the energy absorber of applicant's invention is combination with a tail skid.
Figure 2:
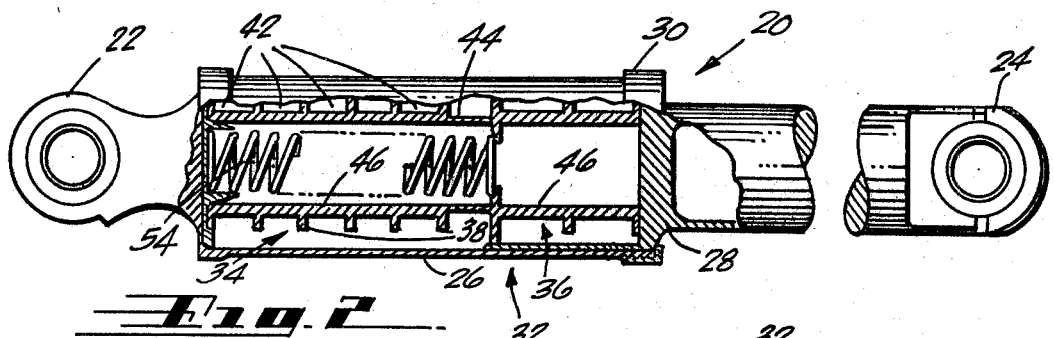
FIGURE 2 is a partial cutaway view of a typical piston and cylinder arrangement in which there is embodied the energy absorber of applicant's invention.
Figure 3:
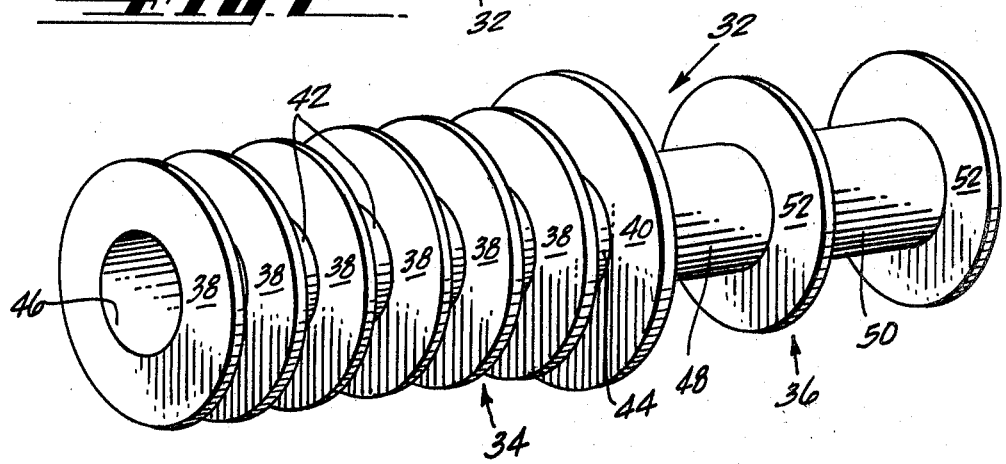
FIGURE 3 is a perspective view of the energy absorber of this invention.

Referring specifically to FIGURE 1, there is shown an empennage 10 of an aircraft fuselage 12. Mounted on the lower portion of the fuselage 12 and under the empennage 10 is a tail skid assembly 14. Assembly 14 includes the tail skid arm 16 which is pivotally connected at 18 to fuselage 12. Connected between the outward extremity of arm 16 and the fuselage is the energy absorber unit 20. Absorber unit 20 is pivotally connected to both arm 16 and the fuselage 12 through connections 22 and 24, respectively. Unit 20 comprises a simple piston and cylinder arrangement which is commonly known and employed in the energy absorbing art. Unit 20 includes a container or a cylinder portion 26 which is fixedly attached to connection 22. Slidably contained within cylinder 26 is a pressure plate or piston 28 which is fixedly connected to connection 24. Cap 30 prevents the withdrawal of piston 28 from within cylinder 26.

Supported between the closed end of cylinder 26 and the piston 28 is the crushable energy absorber 32. Absorber 32 is composed of two areas of different cylinder wall thickness. The first area 34 has a wall thickness which is less than the second area 36. The first area 34 is composed of six stiffening flanges 38 and a separating flange 40. The portions of the cylinder located between the flanges 38 are denoted as compartments 42. The compartment 44 which is directly adjacent the separating flange 40 is of a slightly lesser wall thickness than compartments 42. It was found during tests of the apparatus that the initial force required to initiate crushing of the absorber 32 was substantially greater than that required to crush the remaining compartments 42. To insure maximum energy absorption capabilities, it was desirable that each of the compartments be crushed at substantially the same load. It is for this purpose that compartment 44 was designed to be of a slightly smaller wall thickness so that the initial peak loading condition will be lowered to be substantially on a level with the energy absorbed in the crushing of each of the remaining compartments 42.

Separating flange 40 abuts the edge portion of the piston 28 which is in sliding contact with the cylinder 30 of the absorber unit 20. Flange 40 insures that the entire absorber assembly will crush in a lineal manner and will not buckle at its center under the imposed loading. Each of the flanges 38, because they are integrally connected to the cylinder portion 46 of the absorber act to stiffen the absorber and therefore, require a greater loading to crush the cylinder 46 than a non-flanged cylinder. Further, the flanges 38 because they have divided the entire cylinder length into different compartments, the maximum load condition must be achieved for each compartment before that compartment will fail. In other words, for the entire length of the first area 34 to fail, the maximum loading condition must be achieved six times. If the flanges 38 were not connected to the cylinder portion 46, the cylinder would crush under a diminishing load and peak energy absorption capability would not be achieved.

Referring to the second area 36 two compartments 48 and 50 are shown. Compartment 48 is adjacent the main stiffening flange 52. In the second area 36 the cylinder portion 46 is of a substantially greater wall thickness than was the cylinder portion 46 of the first area 34. This wall thickness has been predetermined to crush just prior to the maximum loading at which the rigid air frame structure will yield. The second area 36 is to function more in the manner of a reserve absorber in that, if the loading causes compression of compartments 48 and 50, more than likely damage to the rigid air frame structure of the aircraft fuselage will result. The loading which is required to fully crush compartments 46 of the first area 34 will be sufficient in most instances.

Located within the cylinder portion 46 is a spring 54. The main function of spring 54 is to expand the absorber unit 20 back to its original position upon crushing of the absorber 32. Spring 54 maintains the crushed absorber in tight contact with the piston 28 and the cylinder 26 thereby keeping the absorber 32 from any vibrational movement therebetween.

It is to be understood that although the depicted embodiment of applicant's invention shows only two main absorption areas, it is to be considered within applicant's invention that either one area may be employed or several areas may be employed. Although the employment of separate areas each requiring different loading thereon to be crushed is believed to be novel, applicant's invention is to be considered to also extend to one single area in which there is mounted thereon several spaced annular flanges which divide the energy absorbing cylinder into separate compartments, each requiring a maximum loading condition before failure occurs. Further, although the stiffening flanges have been described as only being integral with the cylinder portion, it is to be understood that applicant's invention is to be extended to include any mounting of the stiffening flanges in which the desirable energy absorbing capabilities are achieved.

It is to be understood therefore, that the foregoing disclosure relates only to a preferred embodiment of the invention, and that numerous modifications and variations of the present invention are possible in the light of the above teachings, as will be readily apparent to those skilled in the art, without departing from the spirit and scope of the present invention.

I claim:
1. A crushable energy absorber comprising:
a container having a closed end portion;
a pressure plate movable within said container; and
energy absorbing means disposed in said container intermediate said pressure plate and said closed end portion for absorbing energy resulting from relative movement toward each other of either said pressure plate or said closed end portion, said energy absorbing means comprising:
a thin walled cylinder member; and
a plurality of spaced annular flanges integrally attached to the exterior of said cylinder member, the portion of said cylinder member between adjacent flanges comprising compartments forming a first area, each of said compartments buckles under a predetermined load to absorb energy.

2. An apparatus as defined in claim 1 wherein a second area of compartments being connected in axial alignment to said first area of compartments, said second areas of compartments being divided by flanges, the wall thickness of said cylinder member of said second area being different than the wall thickness of said cylinder member of said first area.

3. An apparatus as defined in claim 2 wherein the compartment of said first area being nearest said separating flange being the compartment having the lesser cylinder wall thickness.

References Cited

UNITED STATES PATENTS

| 2,401,748 | 6/1946 | Dillon. | |
| 3,228,492 | 1/1966 | Blumrich | 188—1 |
| 3,252,548 | 5/1966 | Pajak et al. | 188—1 |

DUANE A. REGER, Primary Examiner

U.S. Cl. X.R.

244—138